United States Patent [19]

Hull

[11] Patent Number: 4,661,895

[45] Date of Patent: Apr. 28, 1987

[54] ADJUSTABLE COUNTERBALANCED ARM ASSEMBLY FOR AN ELECTRIC LAMP

[76] Inventor: James R. Hull, 148 S. Westgate Ave., Los Angeles, Calif. 90049

[21] Appl. No.: 249,431

[22] Filed: Mar. 31, 1981

[51] Int. Cl.⁴ .......................... F21M 3/18; F21S 1/12; F16F 1/06

[52] U.S. Cl. .................................... 362/427; 267/155; 362/395; 362/396; 362/399; 362/401; 362/410; 362/419; 362/430

[58] Field of Search ............... 362/382, 399, 400, 401, 362/402, 410, 413, 414, 418, 419, 421, 422, 427, 428, 430, 403, 404, 407, 408, 457, 458, 804, 395, 396, 399, 401, 410, 419, 427, 430; 403/53, 87, 97, 103, 111, 112, 147, 148, 164; 248/123.1, 280.1, 289.1, 292.1; 267/154, 155; 174/86; 411/55, 60, 57

[56] References Cited

U.S. PATENT DOCUMENTS

| | | | |
|---|---|---|---|
| 297,269 | 4/1984 | Klein | 362/419 X |
| 1,076,175 | 10/1913 | Antwerp | 411/57 |
| 1,299,899 | 4/1919 | Bessey et al. | 362/419 X |
| 1,591,791 | 7/1926 | Sprout | 362/410 X |
| 1,708,047 | 4/1929 | Bosworth | 362/419 X |
| 1,865,179 | 6/1932 | Egli | 362/410 X |
| 2,052,793 | 9/1936 | Peirce | 411/57 |
| 2,098,016 | 11/1937 | Schuetz | 267/155 X |
| 2,163,070 | 6/1939 | Stringer | 362/399 X |
| 2,297,781 | 10/1942 | Korengold | 362/804 X |
| 2,458,967 | 1/1949 | Wiedenhoeft | 362/419 X |
| 2,481,037 | 9/1949 | Pringle | 267/155 X |
| 2,653,219 | 9/1953 | Popp | 362/399 |
| 3,291,977 | 12/1966 | Nafe | 362/430 X |
| 3,983,386 | 9/1976 | Schallenkammer | 362/427 |
| 4,233,655 | 11/1980 | Zelina, Jr. et al. | 362/399 X |

FOREIGN PATENT DOCUMENTS

| | | | |
|---|---|---|---|
| 843632 | 7/1952 | Fed. Rep. of Germany | 267/155 |
| 543890 | of 1922 | France | 362/419 |
| 1146540 | 5/1957 | France | 362/427 |
| 400359 | of 1963 | Switzerland | 362/419 |
| 2047323A | 11/1980 | United Kingdom | 403/103 |

*Primary Examiner*—Deborah L. Kyle
*Assistant Examiner*—John E. Griffiths
*Attorney, Agent, or Firm*—Keith D. Beecher

[57] ABSTRACT

An equipoised lamp is provided which comprises a lamp head mounted on an adjustable arm assembly which is counter-balanced by internal coaxial torsion springs mounted within the adjacent end sections of the arms. The end sections are bent at 90°, so that the arms may be set to desired angular positions about respective mutually perpendicular axes. The arms may be mounted on an upright base so that the assembly constitutes a floor lamp, or they can be clamped to a table, to provide a draftsman's lamp assembly, and the like. The lamp head itself is mounted at an intermediate position on one of the arms, so that the end of that arm may form a handle for manually adjusting the lamp head to any desired position without any need to touch the hot lamp.

3 Claims, 14 Drawing Figures

ADJUSTABLE COUNTERBALANCED ARM ASSEMBLY FOR AN ELECTRIC LAMP

BACKGROUND

Spring counterbalanced arm assemblies have been provided in the prior art for supporting electric lamp heads. Such assemblies usually incorporate external tension springs, and those which have been provided which are free from external springs have, for the most part, had substantial deficiencies in use. For example, some have not functioned properly while others are too complicated or costly or have limited useful life. The counterbalanced arm assembly with external coil tension springs have operated satisfactorily, however, the springs tend to collect dust and are difficult to keep clean. The counterbalanced arm assemblies with external springs are usually provided with two parallelogram arm assemblies, the lower of which is mounted at its bottom end upon a swivel point, and hinged at its other end to the upper end. The lamp head is mounted on the other end of the upper end, and is thereby provided with a universal joint mounting. Spring tension forces support the lamp assembly so that it can be moved throughout a wide range both vertically and horizontally.

An objective of the present invention is to provide a counterbalanced arm assembly which has all the features of the external spring assembly insofar as operation, cost and long life is concerned, but which is equipped with innersprings, so that the problems of external springs are resolved.

Accordingly, the principal objectives of the present invention are to provide an improved spring counterbalanced arm assembly for an electric lamp head, or the like, which is simple and inexpensive to construct, which is easy to adjust to any desired position and inclination of the lamp head without burning the fingers of the operator, and which is trouble-free in its operation.

DETAILED DESCRIPTION OF THE ILLUSTRATED EMBODIMENTS

Figure 1:
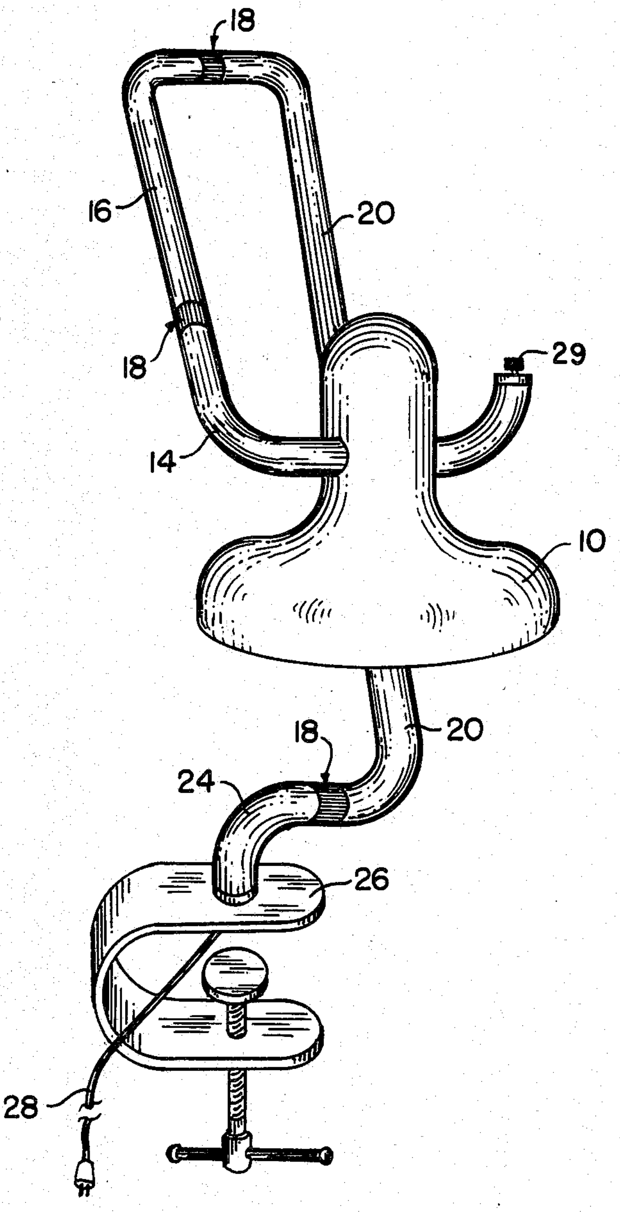
FIG. 1 is a perspective representation of one embodiment of the assembly of the present invention which is adapted to be mounted on the edge of a table, to be adjustable to any desired position across the top surface of the table and at any desired distance above the table, and at any desired inclination of the lamp head itself.
Figure 3:
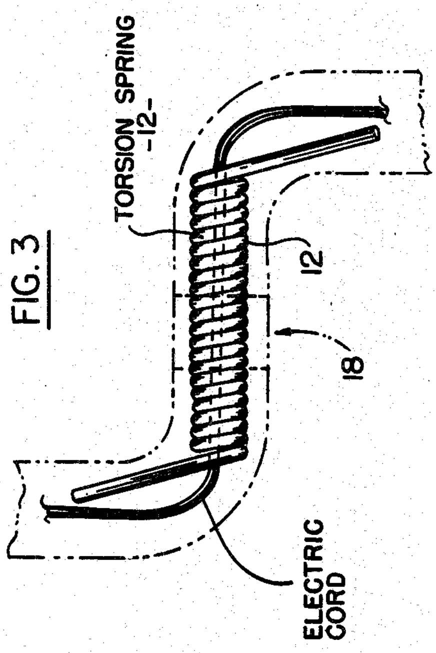
FIG. 3 is a fragmentary view showing the manner in which a counterbalancing torsion spring is mounted within the bent-over end sections of adjacent tubular arms in the assembly.

The assembly of FIG. 1 comprises a lamp head 10 which is mounted on a tubular arm assembly that is counterbalanced by internal coaxial torsion springs, such as the spring 12 of FIG. 3, coaxially mounted in the end sections of adjacent arms. The arm assembly includes a first hollow tubular arm 14 for supporting the lamp head 10, and which has a bent-over end section coupled to a second hollow tubular arm 16 through a coupling assembly 18, so that the arm 14 may be turned to any desired angular position about the common longitudinal axis of arms 14 and 16. The other end section of arm 16 is bent at 90°, and it is coupled to the bent-over end section of a third hollow tubular arm 20 by a like coupling sub-assembly 18, so that the second arm 16 may be turned to any desired angular position about the axis of the coaxial end sections of arms 16 and 20.

Figure 2:
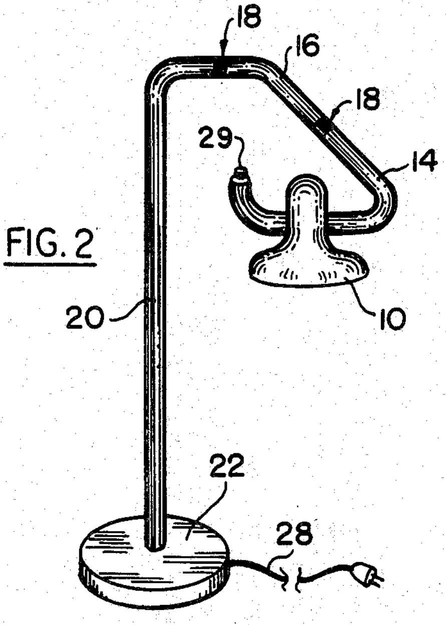
FIG. 2 is a perspective representation of a second embodiment of the assembly of the present invention which is adapted to operate as a floor lamp.

Arm 20 may be mounted in an upright position on a base 22, as shown in FIG. 2, so that the assembly may serve as a floor lamp. Alternately, and as shown in FIG. 1, the bent-over end section of tubular arm 20 may be coupled to the bent-over end section of a further hollow tubular arm 24 through a like coupling sub-assembly 18. In this way, the tubular member 20 may be turned to any desired angular position about the axis of the coaxial end sections of the arms 20 and 24.

The other end of arm 24 is pivotally coupled to a C-clamp 26, so that the entire assembly may be turned about the axis of the second end section of arm 24. C-clamp 26 may be clamped to a table, so that the lamp head 10 may be moved to any desired position across the top surface of the table, at any desired displacement from the top surface, and at any desired inclination of lamp 10. Electrical energy to the lamp is supplied through a usual electric cord 28 which extends through the interiors of the tubular arms 24, 20, 16 and 14, and through the torsion springs 12 contained in the respective coupling sub-assemblies 18.

An electric switch 29 for the lamp head 10 is mounted on the distal end of arm 14. The lamp head 10, as shown in FIGS. 1 and 2, is mounted at an intermediate position on arm 14, so that the distal end of arm 14 may serve as a handle for manually adjusting the assembly without any likelihood for the operator to burn his fingers.

Figure 4:
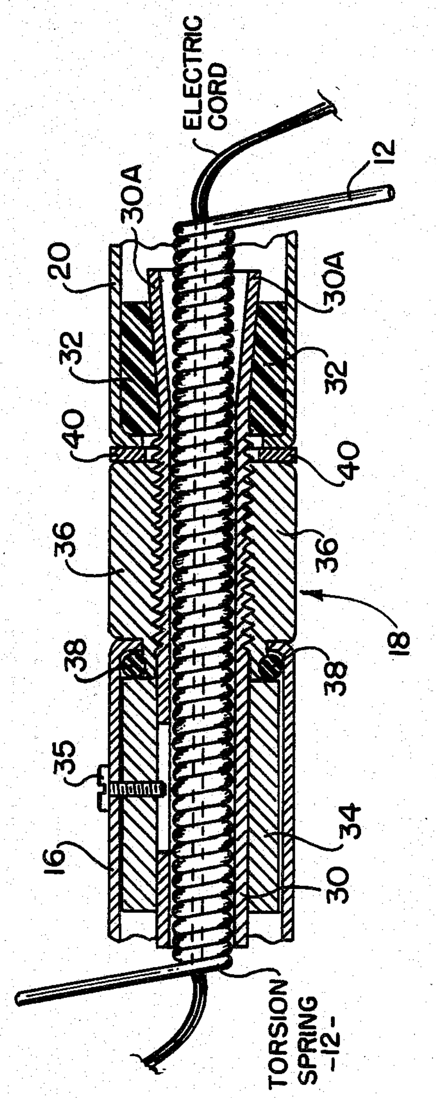
FIG. 4 is a fragmentary side section of an adjustable coupling assembly which is interposed between the end sections of adjacent tubular arms of the assembly of FIGS. 1 and 2.
Figure 6:
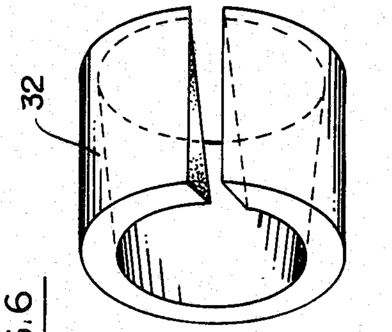
FIG. 6 is a perspective view of an annular wedge which is used in the coupling assembly of FIG. 4.

In addition to the coiled torsion spring 12, the coupling assembly 18 also includes an internal tubular member 30 which extends coaxially between the end sections of the adjacent tubular arms, such as arms 16 and 20, for example, as shown in FIG. 4. The right-hand end of the internal tubular member, designated 30A is flared, as shown. A split ring wedge 32 (see also FIG. 6) formed, for example, of nylon or other appropriate material is interposed between the flared end section 30A of the internal tubular member 30 and the inner surface of tubular arm 20.

Figure 5:
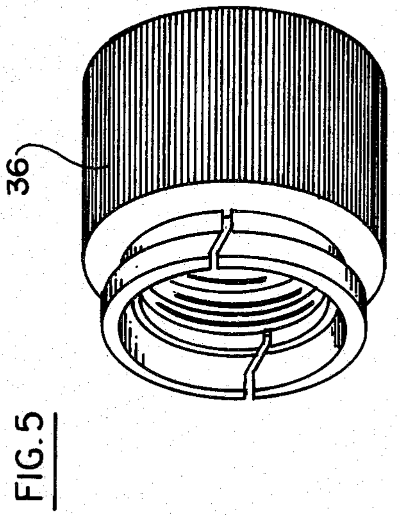
FIG. 5 is a perspective view of an annular control knob used in the coupling assembly of FIG. 4.

A bushing 34 is interposed between the other end of internal tubular member 30 and the internal surface of the tubular arm 16. The inner tubular member 30 is slotted, and a screw 35 extends through the tubular arm 16 and into the slot, so as to prevent rotation of the internal tubular member. An annular knob 36 (FIG. 5) is interposed between the ends of the tubular arms 16 and 20, and the knob is threaded to the internal tubular member 30. The left-hand end of the annular knob 36 has a groove for receiving the bent-over end of the tubular arm 16, and an O-ring 38 is interposed between the bent-over end of the arm 16 and the adjacent end of bushing 34. A metallic washer 40 is interposed between the other end of knob 36 and the bent-over end of the tubular arm 20 to serve as a bearing surface.

When the annular knob 36 is turned in one direction, the internal tubular member 30 is drawn axially to the left with respect to the end sections of the arms 16 and 20, to tighten the annular wedge 32 against the internal surface of tubular arm 20. Alternately, when knob 36 is turned in the opposite direction, tubular member 30 is moved axially or to the right to loosen the annular wedge. Therefore, by manually adjusting the knob 36, each of the coupling sub-assemblies 18 may be tightened or loosened, to provide any desired degree of friction resistance in the arm assembly.

Figure 7A:
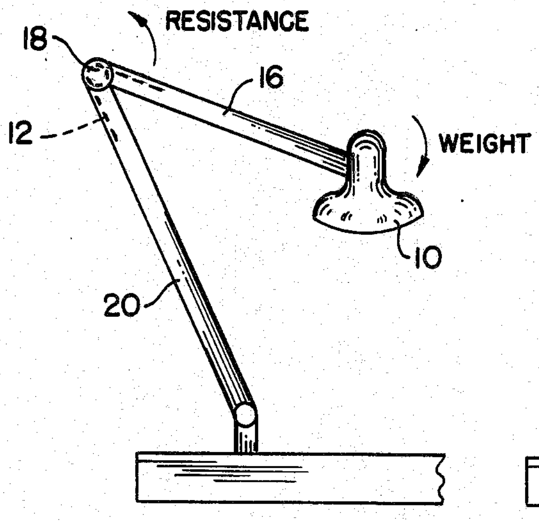
FIGS. 7A, 7B; 8A, 8B, 8C and 9A, 9B, 9C are schematic representations showing various functions of the torsion springs in the various coupling assemblies of different versions of the lamp.
Figure 7B:
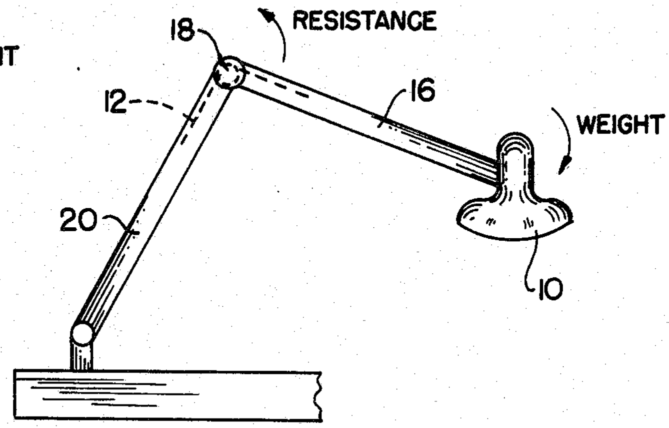
Figure 8A:
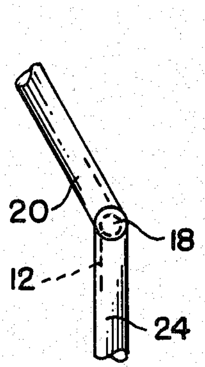
Figure 8B:
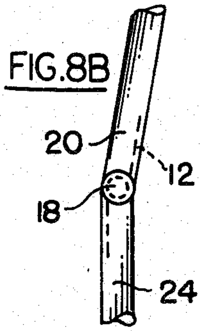
Figure 8C:
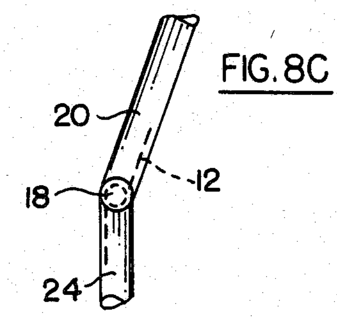
Figure 9A:
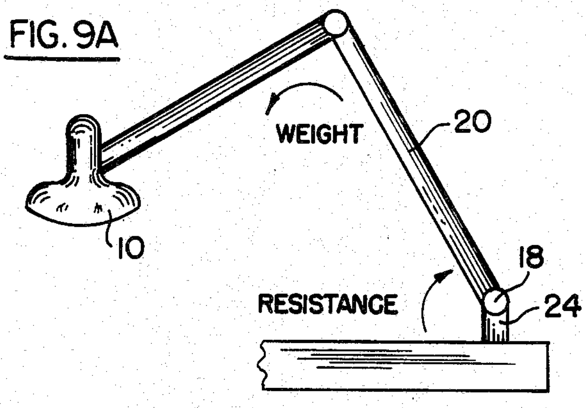
Figure 9C:
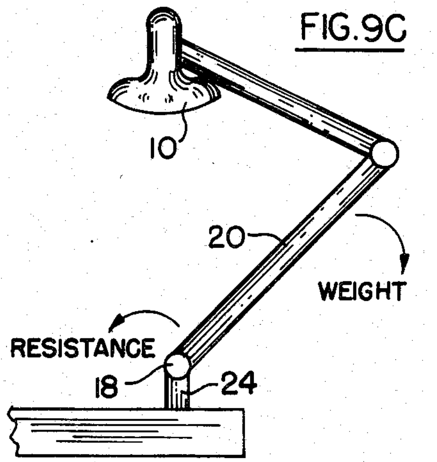
Figure 9B:
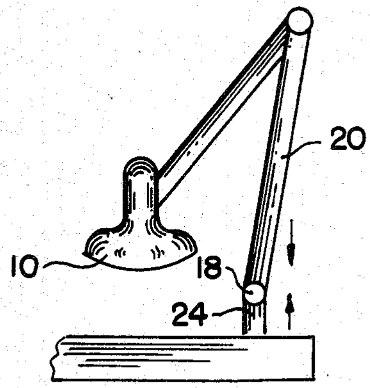

The torsion spring in coupling assembly 18 between tubular members 16 and 20 functions in normal manner to resist turning of cantilevered member 16 in one direction only so as to support the weight of lamp 10 (FIG. 7A and 7B). However, a very stiff torsion spring is used in the lower coupling 18 between tubular members 20 and 24 to resist turning in either direction of member 12, as shown in FIGS. 8A, 8B, 8C and 9A, 9B, 9C. In FIG. 8A, when arm 20 is turned in the forward direction, torsion spring in lower coupling 18 acts to resist forward movement of the arm. In FIG. 8B, when arm 20 is vertical, the torsion spring is in equilibrium. In FIG. 8C, when arm 20 is turned in the backward direction, the torsion spring acts in the opposite way to resist movement of the arm. The torsion spring in the lower coupling 18 in the slightly different version of FIGS. 9A, 9B, 9C acts in the same way for the three illustrated angular positions of arm 20.

The invention provides, therefore, an improved lamp assembly which includes counterbalanced tubular arms, one of which may be configured to form an appropriate handle for manually adjusting the lamp head to any desired position.

It will be appreciated that while particular embodiments of the invention have been shown and described, modifications may be made, and it is intended in the claims to cover all modifications which come within the true spirit and scope of the invention.

What is claimed is:

1. A counterbalanced arm assembly for supporting a lamp head, or the like, comprising: at least two tubular arms; and means coupling the end sections of the tubular arms to one another in mutual coaxial relationship, said means including a coiled torsion spring mounted coaxially within the end sections of the tubular arms to provide counterbalancing forces, in which said coupling means includes an internal tubular member extending coaxially between said end sections, said internal tubular member having a flared end, a coaxial annular wedge interposed between the internal tubular member and the internal surface of one of said two tubular arms adjacent to the flared end of said internal tubular member, and adjustable means for moving the internal tubular member axially with respect to said end sections to cause the flared end thereof to move the annular wedge into frictional engagement with the internal surface of the aforesaid tubular arm.

2. The counterbalanced arm assembly defined in claim 1, in which said adjustable means comprises an annular knob interposed between the end sections of the two tubular arms in surrounding coaxial relationship with the internal tubular member and threadably coupled to said internal tubular member.

3. An equapoised lamp assembly comprising: three tubular arms having bent-over end sections; movable means coupling the end sections of the tubular arms to one another in mutually coaxial relationship, and means including a coiled torsion spring mounted coaxially within the end sections of the tubular arms to provide counterbalancing forces for said tubular arms; a lamp head mounted on one of said tubular arms for movement to selected positions by causing the arms to turn to selected angular positions about two mutually perpendicular axes; a fourth tubular arm having a bent-over section, and a further one of said coupling means coupling the end section of the fourth tubular arm to the end section of the third tubular arm, so that movement of the lamp causes the tubular arms to turn to selected angular positions about three different axes; said lamp head being mounted on one of said tubular arms at an intermediate position so that the distal end of such arm may function as a handle for permitting manual adjustment of the position of said lamp head, and which includes an electric switch for the lamp head mounted on the distal end of said first arm.

* * * * *